United States Patent
Hoffmann et al.

(10) Patent No.: US 6,715,418 B2
(45) Date of Patent: Apr. 6, 2004

(54) APPARATUS FOR PRODUCING A SLEEVE-LIKE PRINTING FORM

(75) Inventors: Eduard Hoffmann, Bobingen (DE); Johann Winterholler, Friedberg (DE); Alfons Grieser, Sielenbach (DE); Katrin Bilzer, Baar (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 0 days.

(21) Appl. No.: 10/114,147

(22) Filed: Apr. 2, 2002

(65) Prior Publication Data

US 2002/0139267 A1 Oct. 3, 2002

(30) Foreign Application Priority Data

Apr. 3, 2001 (DE) .......................................... 101 16 609

(51) Int. Cl.[7] .............................................. B21B 39/02
(52) U.S. Cl. .............................. 101/375; 72/51; 72/367; 228/15.1; 228/44.3
(58) Field of Search ............................... 72/51, 133, 52, 72/48, 367, 368, 369; 101/375, 401.1; 228/15.1, 44.3

(56) References Cited

U.S. PATENT DOCUMENTS

| | | | | |
|---|---|---|---|---|
| 3,835,682 A | * | 9/1974 | Elger | .......................... 72/18.1 |
| 5,499,580 A | | 3/1996 | Hoffmann et al. | .......... 101/375 |
| 5,557,960 A | | 9/1996 | Hoffmann et al. | .............. 72/51 |
| 5,992,727 A | | 11/1999 | Hoffmann et al. | ........... 228/6.1 |
| 6,112,663 A | * | 9/2000 | Ulrich et al. | ............ 101/389.1 |
| 2001/0022145 A1 | * | 9/2001 | Kawamura et al. | ...... 101/401.1 |

* cited by examiner

*Primary Examiner*—Andrew H. Hirshfeld
*Assistant Examiner*—Kevin D. Williams
(74) *Attorney, Agent, or Firm*—Cohen, Pontani, Lieberman & Pavane

(57) ABSTRACT

Apparatus includes a housing, a feed table outside the housing for receiving a plate-like blank, a round shaping device in the housing for shaping the blank into a sleeve-like printing form, a welding system, and a transport device for fixing, transporting and depositing the blank aligned level on the shaping device. The transport device includes a plate suction frame penetrated by suction elements which make contact with the blank placed on the feed table. After contact has been made, the blank is fixed by activating the suction elements on the plate suction frame so as to be aligned level, and transported in a stable position to the round shaping device. The raw form is deposited on the round shaping device so as to be aligned level and fixed in-register.

14 Claims, 7 Drawing Sheets

APPARATUS FOR PRODUCING A SLEEVE-LIKE PRINTING FORM

BACKGROUND OF THE INVENTION

1. Field of the Invention

The invention relates to an apparatus for producing a sleeve-type printing forme from a plate-like blank, including a housing, a feed table outside the housing for receiving a plate-like blank, a round shaping device in the housing for shaping a plate-like blank into a sleeve-type printing forme, a transport device which is moveable to transport the plate-like blank from the feed table to the round shaping device, and a laser cutting and laser welding system in the housing for laser cutting and laser welding the plate-like blank on the round shaping device after the blank has been formed into a sleeve.

2. Description of the Related Art

U.S. Pat. No. 5,557,960 discloses an apparatus of this type, which merely requires the plate-like blank to be inserted manually and, after the plate has been inserted, automatically permits the round shaping operation and the exact register-maintaining positioning of the ends of the plate to be joined or to be welded.

In order to avoid cutting the plate-like raw forme to length outside this apparatus by means of a sheet-metal shear, whilst maintaining the dimensions, it is proposed in U.S. Pat. No. 5,499,580 to improve the production operation of the sleeve-like printing forme in this apparatus by cutting the plate-like raw forme, having a width corresponding to the forme cylinder, to length roughly at a length that is greater than that defined for a printing forme. The raw forme in the in-register, rounded state is cut to length, maintaining its dimensions, in the welding apparatus by means of the laser beam as a cutting device, so that at least one piece of waste is produced. The piece of waste is removed, the two edges of the plate forming the start and end of the printing forme are set opposite each other with no overlap and are welded to each other.

U.S. Pat. No. 5,992,727 discloses a further generic apparatus. Here, above the feed table and in the housing which can be closed so as to be secure against radiation, an opening is left through which a device for fixing the plate-like blank as a planar raw forme, in the forme of a fixing frame that can be adjusted to the appropriate plate size, can be moved out of the housing over the feed table in order to pick up the raw forme.

The fixing frame comprises two holdfast strips which can be adjusted on a carriage in accordance with the distance between the edges of the plate of the raw forme to be joined and can be set longitudinally on the respective plate edge. The fixing frame further comprises a register device, which is designed such that it interacts with a register system on the plate-like raw forme. For example, the plate edges here can be fixed in-register to these holdfast strips by means of a pin register belonging to the holdfast strips arranged on the fixing frame and a register hole system belonging to the plate-like raw forme.

The disadvantage of the apparatus described above is that in order to produce the sleeve-like printing forme in register, operations are carried out with an external register hole system as a register device. However, this always requires the use of a plate punch by means of which the plate-like raw forme is provided with the register device in the form of the register hole system.

SUMMARY OF THE INVENTION

It is an object of the invention to provide an improved generic apparatus which ensures an in-register production operation of the sleeve-like printing forme, it being possible to dispense with a register arranged in the plate-like raw forme in the form of a register hole system.

According to the invention, the transport device includes a plate suction frame penetrated by suction elements for picking up a plate-like blank placed on the feed table in a fixed level position and transporting it in a stable position to the round shaping device so that the plate-like blank can be deposited on the round shaping device aligned level and fixed in register.

A significant advantage is that with the omission of the external register hole system in the plate-like raw forme, a plate punch can be dispensed with. The apparatus according to the invention permits an in-register production operation of a sleeve-like printing forme, less trim being produced when the raw forme is cut to length, maintaining its dimensions, in the in-register, rounded state.

It is significant that, by means of the fixing means configured as suction elements on the plate suction frame of the apparatus, both raw formes made of nonmagnetic material, for example aluminum, and raw formes made of magnetizable material can be fixed flat and aligned level and can be transported. The suction elements are advantageously arranged in a grid. The grid is configured in such a way that a large number of frequently occurring printing-forme diameters and printing-forme widths, which lie within the range of the minimum length and maximum length of the raw forme and therefore determine the extent of the sleeve-like printing forme, are covered. Furthermore, the suction elements are arranged in the grid in such a way that the raw forme, from which the printing-forme diameters and printing-forme widths normally used are produced, is gripped and conveyed by the plate suction frame or by the suction elements without sagging.

Furthermore, it is significant that, by means of the apparatus, a sleeve-like printing forme can be produced both with a variable diameter and with a variable length or printing width.

With the apparatus, it is therefore possible to produce a variable-format sleeve-like printing forme.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
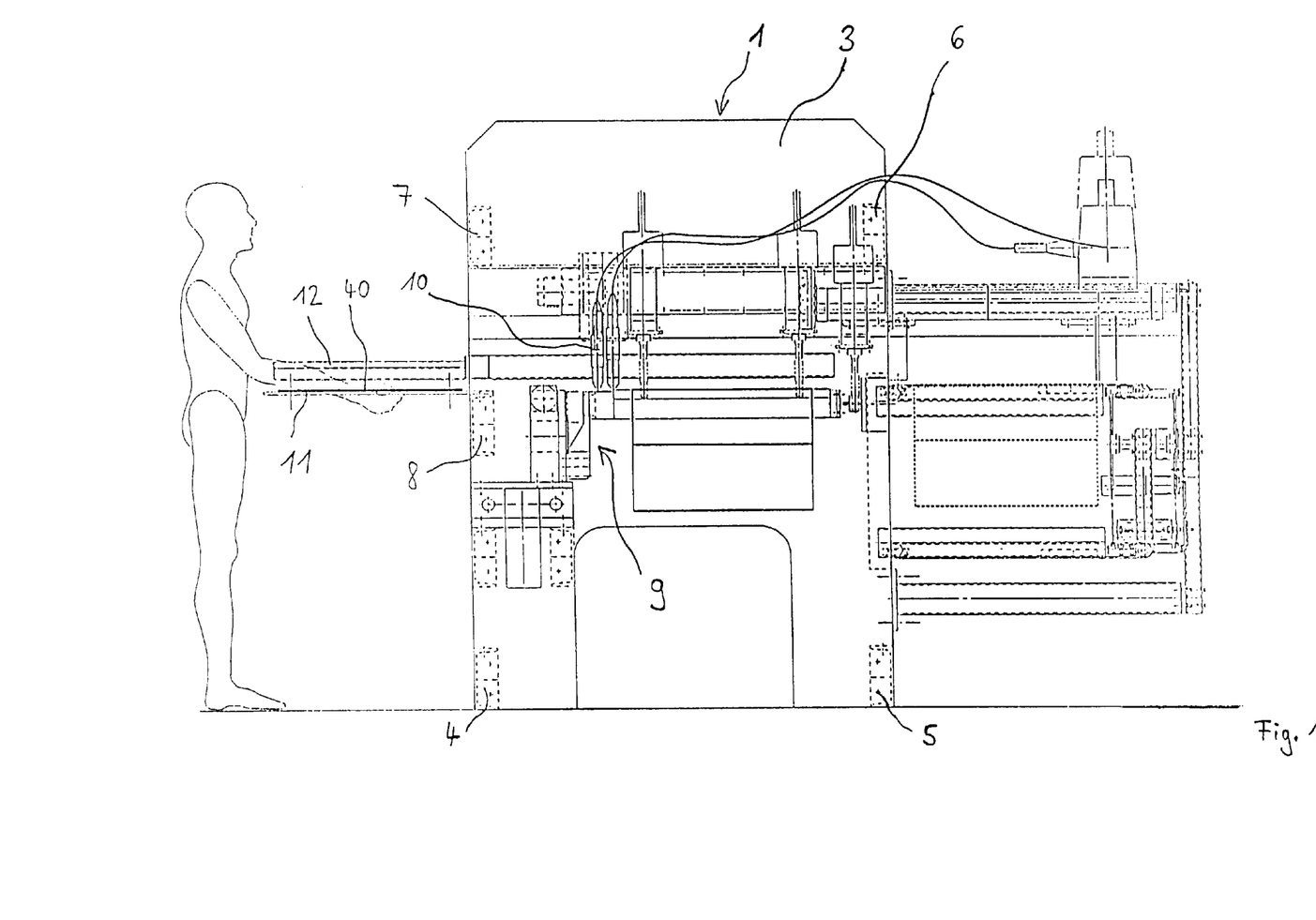
FIG. 1 shows a side view of an apparatus according to the invention for producing a sleeve-like printing forme.

In FIG. 1, a housing 1 comprising side walls 2; 3 and cross members 4; 5; 6; 7; 8 is indicated, in which a device 9 for the round shaping of plate-like blanks and a welding system 10 are integrated.

Arranged outside the housing 1 is a feed table 11, on which plate-like blanks can be deposited manually, preferably pre-centered in a recess and/or by means of stops and/or marks.

Figure 2:
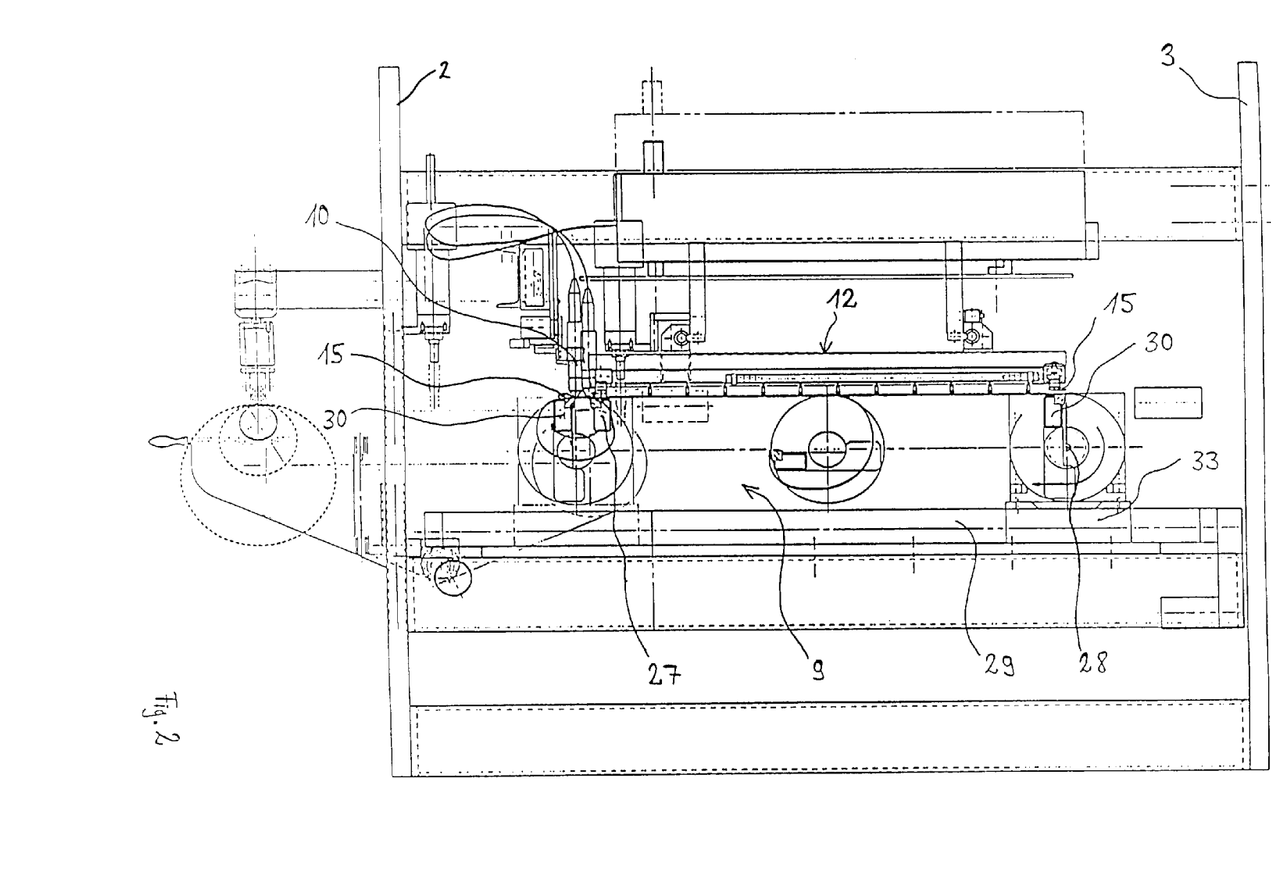
FIG. 2 shows a front view of the apparatus according to the invention.

Above the feed table 11, a device for fixing the plate-like blank of a planar raw forme 40, in the form of a plate suction frame 12 that can be adjusted to the appropriate plate size, can be moved out of the housing 1 over the feed table 11 by means of a linear drive 13 in order to pick up the raw forme 40 (FIG. 2).

Figure 3:
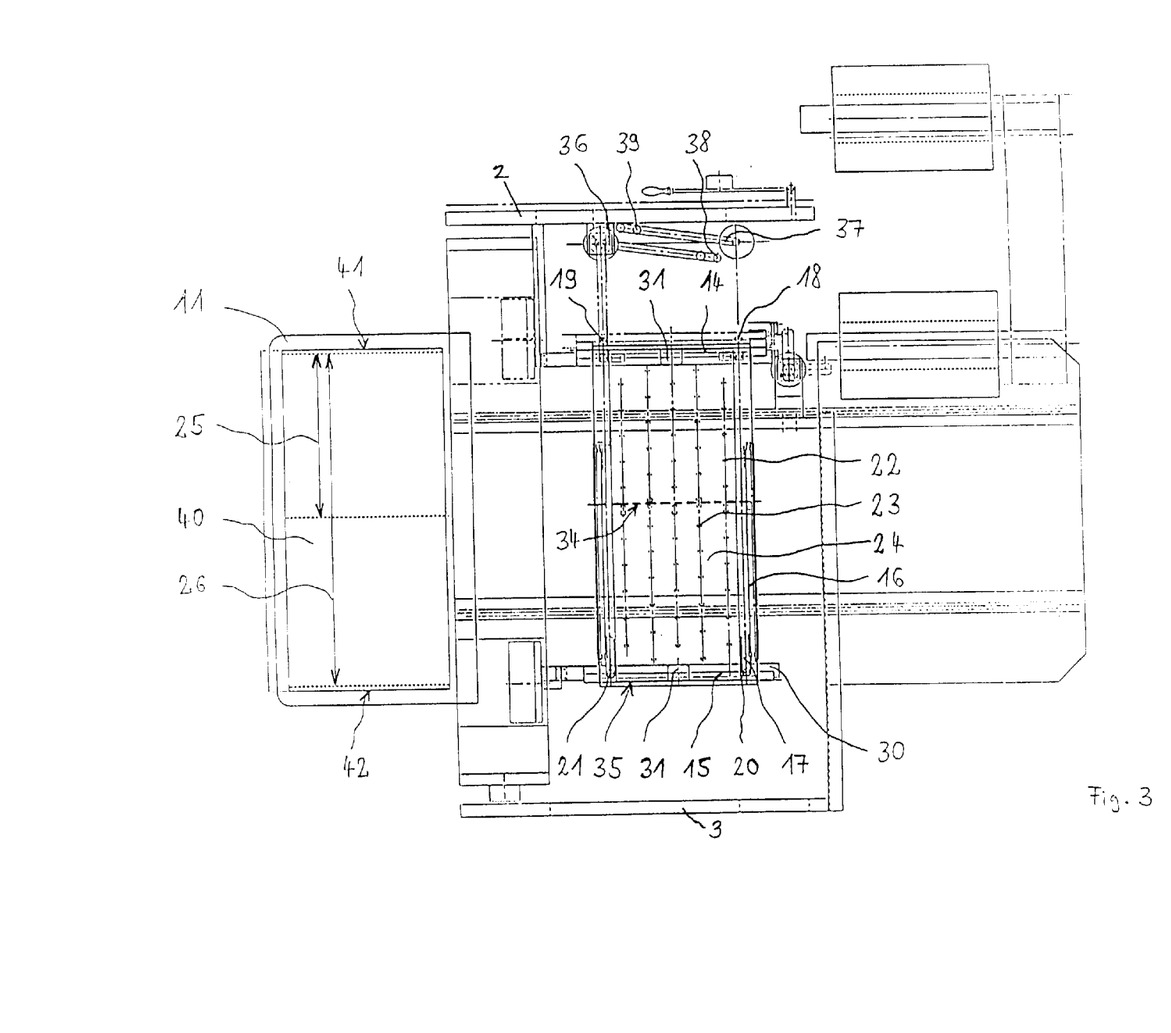
FIG. 3 shows a plan view of the apparatus according to the invention.
Figure 4:
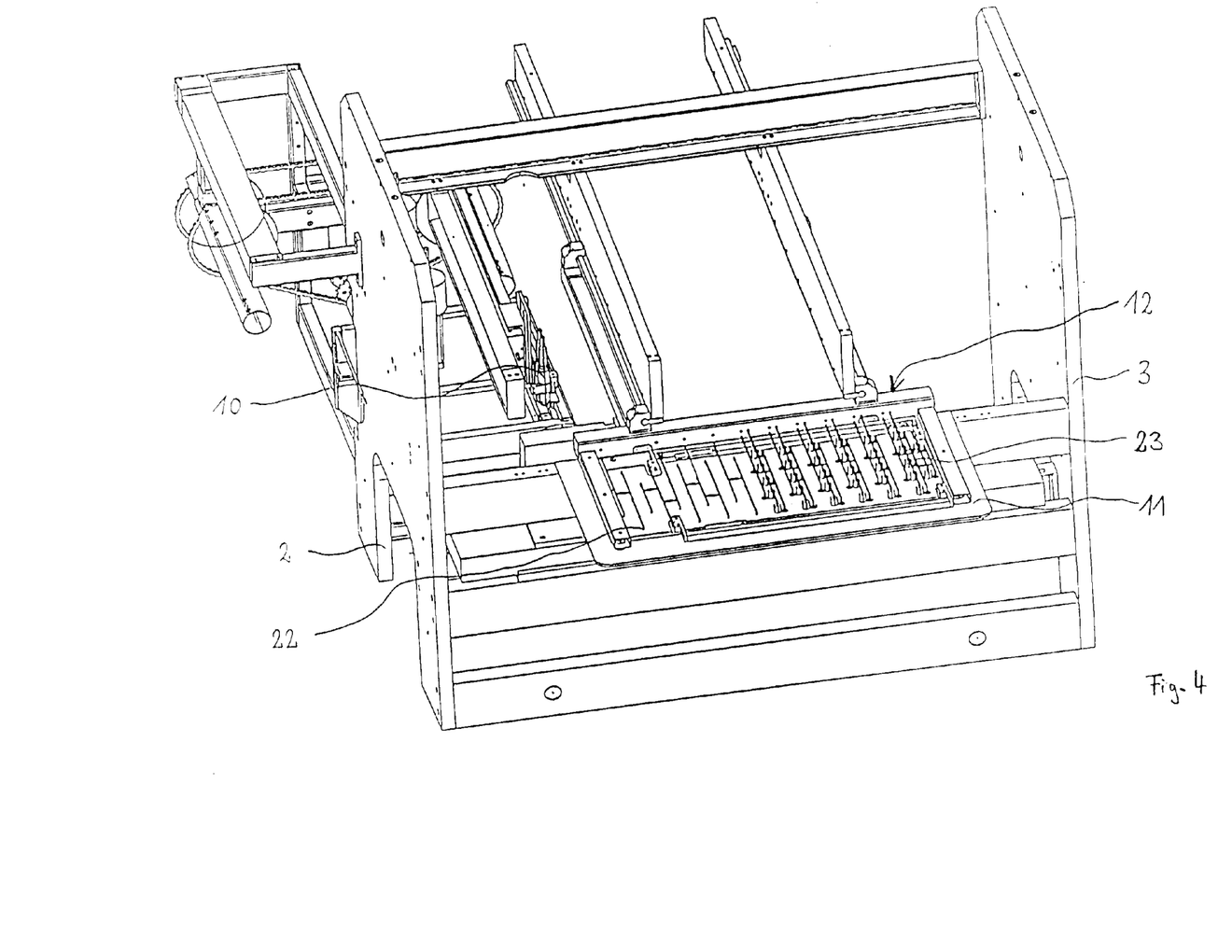
FIG. 4 shows a view seen from the top front of the apparatus according to the invention, the transport apparatus having been moved over the feed table.
Figure 5:
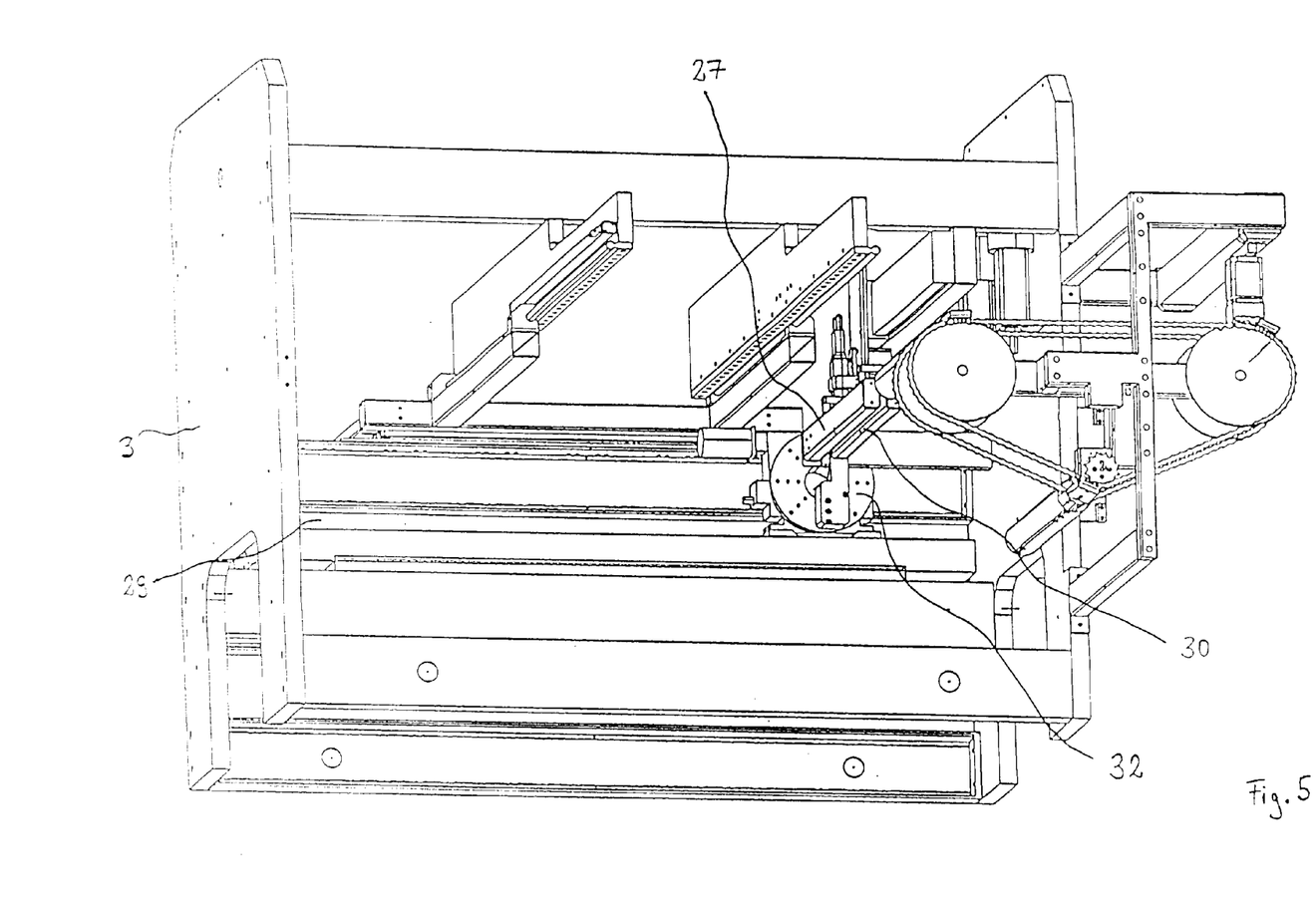
FIG. 5 shows a view seen from the bottom rear of the apparatus according to the invention, the transport apparatus having been moved over the feed table.

The plate suction frame 12 comprises two steel strips 14; 15, it being possible for one, here the steel strip 15, to be adjusted in accordance with the distance between the plate edges 41; 42 of the raw forme 40, to be joined on a carriage 17 driven by means of a linear drive 16, and to be positioned longitudinally on the respective plate edge (FIG. 3).

The position of the plate edge 42 at which the steel strip 15 is positioned is determined (not specifically illustrated) by means of sensors arranged on the carriage 17.

The steel strip 14 is arranged in a fixed position in the plate suction frame 12 via holding elements 18; 19. The steel strip 15 is arranged on the carriage 17 of the plate suction frame 12 by means of holding elements 20; 21.

In a known manner, the holding elements 18 to 21 are preferably designed as electric clamp-on magnets, which can interact with corresponding soft iron cores of the steel strips 14; 15.

The plate suction frame 12 further comprises a plate 24 penetrated by suction elements 22; 23 in a suitable grid. The suction elements 22 are arranged in fixed positions. By means of these suction elements 22 arranged in fixed positions, by lowering the plate suction frame 12 by means of a lifting device 31, a plate-like raw forme 40 with a minimum length 25 can be attracted by suction and fixed to the plate suction frame 12 so as to be aligned level.

The plate-like raw formes 40 which go beyond the minimum length 25 and are designed up to a maximum length 26, depending on the actual length of the raw forme 40, the respective suction elements 23 additionally needed between the range of the minimum length 25 and the maximum length 26 and configured so that they can be set on and off the raw forme can be connected up, in order to attract such a raw forme 40 going beyond the minimum length 25 in a stable position by suction and to fix it to the plate suction frame 12 so as to be aligned level (FIG. 3).

Alternatively, the suction elements 22 can also be configured such that they can be set on and off the raw forme 40.

The data relating to the length of the plate-like raw forme 40 is stored in a machine control system (not specifically illustrated). For example, these data relating to the length of the plate-like raw forme 40 can be entered into the machine control system via a keyboard by a person operating the apparatus. By means of the machine control system, in accordance with the length of the raw forme 40 entered, the suction elements 22; 23 required for in-register and level transport are activated automatically.

Furthermore, it is conceivable, but not specifically illustrated, for an optical or mechanical sensing device to automatically check and detect the size, that is to say both the length and the width, of the plate-like raw forme 40. A controller or control device connected to this sensing device then automatically connects up as required the suction elements 22; 23 required for the fixing to the plate suction frame 12 in accordance with the determined data with regard to the length and width of the raw forme 40.

Following the actuation of the suction elements 22; 23 and the lifting of the plate suction frame 12 by means of the lifting apparatus 31, the plate-like raw forme 40 is held ready to be transported on its upper side, or on the side of the plate suction frame 12 located opposite the feed table 11, and is fixed to the plate suction frame 12 so as to be aligned level.

The plate suction frame 12 can be moved in a first direction into the housing 1 over the round shaping device 9 by means of the linear drive 13, which may be a pull cable, a rack or a chain guide supported in rails. The end positions of the travel of the plate suction frame 12 can be determined in and outside the housing 1, preferably by means of stops.

The round shaping device 9 is described in U.S. Pat. No. 5,557,960, and the functioning is analogous to that. For the plate edges 41; 42 to be joined, a magnetic strip 27 arranged to be stationary and a magnetic strip 30 that can be rotated about an axis 28 and moves transversely along a sliding guide 29 are provided.

Figure 6:
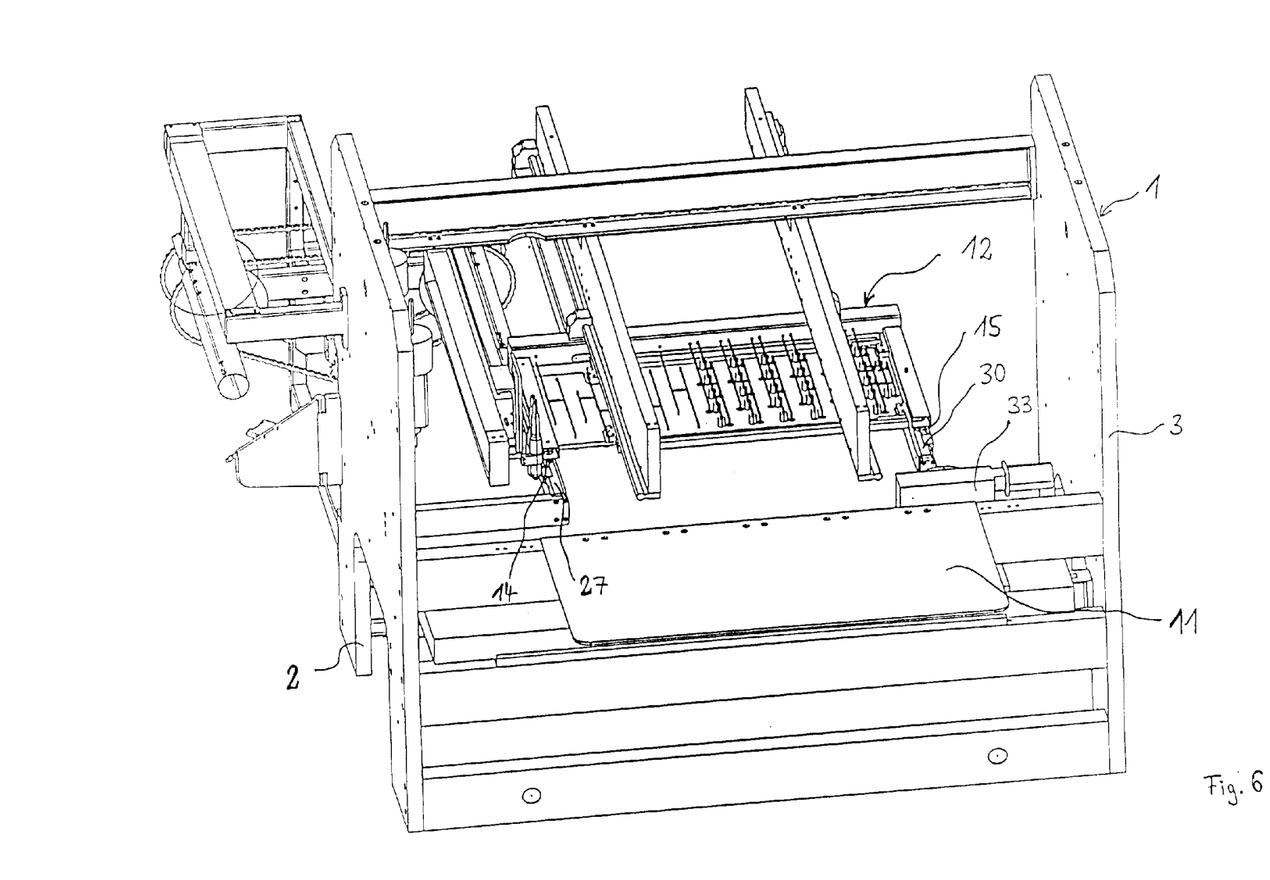
FIG. 6 shows a view seen from the top front of the apparatus according to the invention, the transport apparatus having been moved over the magnetic strips.
Figure 7:
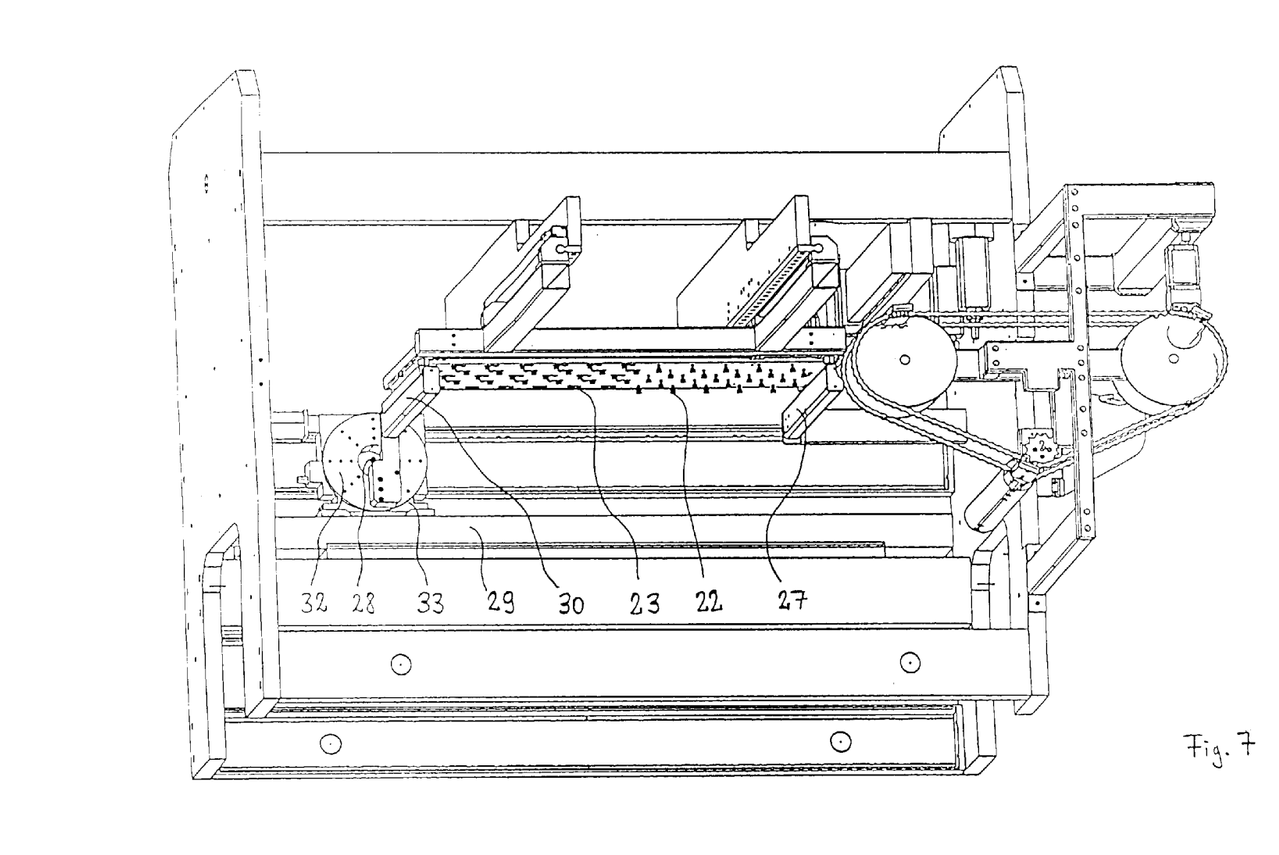
FIG. 7 shows a view seen from the bottom rear of the apparatus according to the invention, the transport apparatus having been moved over the magnetic strips.

In a known way, the magnetic strips 27; 30 are preferably configured as electric clamp-on magnets (FIG. 2; FIG. 6; FIG. 7).

The magnetic strip 30 that can be moved transversely is positioned in accordance with the respective length of the plate-like raw forme 40. The data for positioning the magnetic strip 30 that can be moved transversely are made available, for example, by the sensing device described above and/or the machine control system.

Once the plate suction frame 12 has been positioned over the appropriately adjusted magnetic strips 27; 30, then the plate suction frame 12 is lowered in the direction of the magnetic strips 27; 30, by means of a lifting apparatus 31 arranged on the plate suction frame 12, until the steel strips 14; 15 rest on the magnetic strips 27; 30. The steel strips 14; 15 of the plate suction frame 12 can be attracted electromagnetically and the plate-like raw forme 40 can be clamped onto the magnetic strips 27; 30.

After the plate-like raw forme 40 has been clamped onto the magnetic strips 27; 30 by means of the electromagnetically attracted steel strips 14, 15, the suction elements 22; 23 are set off, so that the plate-like raw forme 40, stretched horizontally, is still fixed in-register between the magnetic strips 27; 30 in conjunction with the steel strips 14; 15 (FIG. 7).

The empty plate suction frame 12 can be moved out of the working range of the round shaping device 9 until, not specifically illustrated, its housing termination, for example, closes a housing opening in a protective manner against radiation which may emanate to the outside.

In order to shape the sleeve, the magnetic strip 30 is rotated and at the same time is displaced transversely to the first direction, toward the stationary magnetic strip 27. To this end, the magnetic strip 30 is constructed on a round table 32, which can be moved in a carriage 33 on the sliding guide 29 (FIG. 2; FIG. 7). In the process, the magnetic strip 30 travels under the stationary magnetic strip 27 and, after a complete revolution, is opposite the stationary magnetic strip 27, so that the plate edges are likewise opposite each other.

At the point at which the magnetic strips 27; 30 are opposite each other, forming a sleeve-like printing forme, a welding system in the form of at least one laser 10 is arranged in the housing 1, above the magnetic strips 27; 30, so that laser cutting and laser welding can be carried out on the sleeve-like printing forme, as already described in U.S. Pat. No. 5,499,580.

All the operations for producing a sleeve-like printing forme, with the exception of the manual insertion of the plate-like blank of the raw forme 40 from the plate stack onto the feed table 11, can be carried out completely automatically in this apparatus. At the same time, a plate stack comprising a plurality of such blanks can in turn be placed on the feed table 11.

As an alternative, not specifically illustrated, the feed table can also be configured like a lifting apparatus, on which a stack of a plurality of plate-like raw formes can be placed. By means of the lifting apparatus, the stack of plate-like blanks of the raw formes is conveyed to the plate suction frame 12. From this stack, starting from the uppermost raw forme, the plate suction frame picks up a raw forme, aligned level, piece by piece and transports the latter to the circular shaping device 9. It is conceivable that a large number of stacks, for example arranged on pallets, can be brought to the position of the lifting apparatus, these stacks then being picked up automatically by the lifting apparatus and the stacks being processed piece by piece as already explained above, it being possible for the apparatus for producing a sleeve-like printing forme to be switched off automatically after processing a plate stack of plate-like blanks of the raw formes on the feed table or the lifting apparatus.

Alternatively, instead of switching off the apparatus for producing a sleeve-like printing forme as described above by means of a controller and/or control device, a next stack of blanks arranged on a pallet can be brought to and onto the lifting apparatus in automated fashion and processed piece by piece. In this way, endless production of sleeve-like printing formes can be provided.

The further functioning of the apparatus according to the invention is carried out substantially analogously to the working steps already explained in U.S. Pat. No. 5,992,727.

FIG. 3 shows the apparatus according to the invention in the start position, the plate suction frame 12 parked in the housing 1, the round shaping device 9 located in the initial position. The steel strips 14; 15 rest on the magnetic strips 27; 30. In order that the raw forme 40 can be brought between them, the steel strips 14; 15 must be lifted. This is carried out by means of the holding elements 18 to 21 arranged on the plate suction frame 12. The holding elements 20; 21 for lifting the steel strip 15 that is configured so that it can be moved off the moveable magnetic strip can be moved, as described above, by means of a carriage 17 that is driven by a linear drive 16 and can be positioned on the steel strip 15. The holding elements 20; 21 are moved from a minimum plate length position 34 in the direction of the maximum plate length position 35 until sensors which are carried along but not specifically illustrated detect the location of the magnetic strip 30 and of the steel strip 15 seated on the magnetic strip 30 and bring the holding elements 20; 21 into position.

Before the finished sleeve-like printing forme can be removed from the round shaping device, specifically from the magnetic strips 27; 30, the steel strips 14; 15 attracted by the magnetic strips on the basis of the applied magnetic field are lifted off pivoting arms 36; 37 which are rotatably mounted in the housing 1 and have holding elements 38; 39 which are arranged on them and which are designed as electric clamp-on magnets (FIG. 3).

Here, the start position is configured in such a way that the location of the magnetic strip 30 and of the steel strip 15 seated on the magnetic strip 30 is located in the maximum plate length position 35. The location of the magnetic strip 30 and of the steel strip 15 seated on the magnetic strip 30 can alternatively, not specifically illustrated, also be located in the minimum plate length position 34.

With the exception of the start position described in FIG. 3 and the removal of the steel strips, the further functioning of the apparatus according to the invention is analogous to the working steps already explained in U.S. Pat. No. 5,992, 727. These working steps can all proceed in an automated manner.

The working step of the removal of the finished sleeve-like forme from the housing 1 or from the round shaping device 9, transporting it away by means of a conveying device and rolling over the welded seams in the conveying device is likewise analogous to the apparatus and their functioning already described in U.S. Pat. No. 5,992,727. In this way, a multiple sequence of the working steps can be carried out automatically.

The apparatus described in the exemplary embodiment is suitable for processing plate-like raw formes which consist both of non-magnetic material and of magnetic material.

A variant, not specifically illustrated, variant of the apparatus is, in the event of processing plate-like raw formes which consist of a magnetic material, to replace the suction elements described in the exemplary embodiment with electric holding magnets which, like the suction elements, are designed such that they can be connected up and switched off to the size of the raw forme.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An apparatus for producing a sleeve-type printing forme from a plate-like blank having first and second edges to be joined, said apparatus comprising a housing, a feed table outside said housing for receiving a plate-like blank in register, a round shaping device in said housing for shaping the plate-like blank into a sleeve-type printing forme, a transport device which is moveable to transport the plate-like blank from the feed table to the round shaping device, said transport device comprising a plate suction frame penetrated by suction elements which can pick up a plate-like blank placed on the feed table so that said blank is held in a level position in register only by suction, and so that said transport device can transport said blank in a stable position in register to the round shaping device, and so that the plate-like blank can be deposited on the round shaping device aligned level and in the stable position and fixed in register, and a laser cutting and welding system in said housing for laser cutting and laser welding said plate-like blank on said round shaping device after said blank has been formed into a sleeve.

2. An apparatus as in claim 1 wherein said feed table can receive different size plate-like blanks.

3. An apparatus as in claim 1 wherein said plate suction frame comprises a plate penetrated by the suction elements in a grid so that said blank can be held by suction over a broad area between said first and second edges.

4. An apparatus as in claim 2 wherein the feed table can receive a plate-like blank having a length between a minimum length and a maximum length, said suction elements being arranged in a region of a minimum length of a blank on said feed table and in a region between a minimum length and a maximum of a blank on said feed table.

5. An apparatus as in claim 2 wherein said suction elements can be activated in accordance with the size of blank placed on said feed table.

6. An apparatus as in claim 4 wherein said suction elements in said region between said minimum length and said maximum length can be activated in accordance with the actual length of the plate-like blank.

7. An apparatus as in claim 1 further comprising a lifting apparatus for positioning said plate suction frame on a plate-like blank on said feed table.

8. An apparatus as in claim 1 wherein said round shaping device comprises a stationary magnetic strip arranged to pick up the first edge of the plate-like blank, and a magnetic strip that is seated on a round table that can be rotated and moved transversely so that the magnetic strip seated on the round table can be moved transversely to pick up the second edge of the plate-like blank in accordance with the position of the second edge which results from the length of the blank.

9. An apparatus as in claim 8 wherein said round table can be rotated and transversely displaced after said first and second edges have been picked up by respective said magnetic strips so that said first and second edges are positioned for cutting the edges and welding them together to produce said sleeve-like printing forme.

10. An apparatus as in claim 1 further comprising at least one of optical and mechanical sensing apparatus for determining the actual length and width of the plate-like blank.

11. An apparatus as in claim 10 further comprising a machine control system, said sensing apparatus converting said actual length and width into data that can be transmitted to the machine control system for determining which suction elements need to be activated for the level fixing of the plate-like blank on the plate suction frame.

12. An apparatus as in claim 1 wherein said feed table can receive a stack of said plate-like blanks, said plate suction frame picking up said plate-like blanks one at a time, said apparatus comprising means for switching off automatically when said stack has been processed.

13. An apparatus as in claim 1 wherein said laser cutting and welding system is arranged over said round shaping device so that laser cutting and welding can be carried out by machine.

14. An apparatus as in claim 1 wherein said transport device is moveable in a first direction to transport said plate-like blank from the feed table to the round shaping device, the round shaping device comprising a carriage which moves transversely to said first direction to shape the plate-like blank into a sleeve-like printing forme.

* * * * *